United States Patent [19]
Tsuge et al.

[11] 4,371,126
[45] Feb. 1, 1983

[54] WEBBING LOCK DEVICE

[75] Inventors: Hiroshi Tsuge, Chiryu; Takashi Kawaharazaki, Toyoake; Jun Yasumatsu, Toyota, all of Japan

[73] Assignees: Toyota Jidosha Kogyo Kabushiki Kaisha; Kabushiki-Kaisha Tokairika-Denki-Seisakusho, both of Tokyo, Japan

[21] Appl. No.: 187,814

[22] Filed: Sep. 16, 1980

[30] Foreign Application Priority Data

Oct. 4, 1979 [JP] Japan .......................... 54-138276[U]

[51] Int. Cl.³ ....................... A62B 35/08; B65H 75/48
[52] U.S. Cl. ........................... 242/107.2; 242/107.4 A; 280/808
[58] Field of Search ....................... 280/806, 808, 801; 242/107.2, 107.4 R, 107.4 A

[56] References Cited

U.S. PATENT DOCUMENTS 4,163,530 8/1979 Konjo et al. ...................... 242/107.2
4,211,377 7/1980 Yasumatsu ........................ 242/107.2

Primary Examiner—Richard A. Bertsch
Attorney, Agent, or Firm—Stevens, Davis, Miller & Mosher

[57] ABSTRACT

A pair of lock members are provided for directly locking the intermediate portion of an occupant restraining webbing, and at least one of said pair of lock members is provided at the clamping surface thereof with a curvature, whereby a sharp change in tension in the clamped webbing is avoided to prevent the webbing from being ruptured, thus enabling to reliably restrain an occupant.

10 Claims, 10 Drawing Figures

WEBBING LOCK DEVICE

BACKGROUND OF THE INVENTION

1. FIELD OF THE INVENTION

The present invention relates to webbing lock devices for use in a seatbelt system for restraining and protecting an occupant in an emergency of a vehicle, and more particularly to a webbing lock device for instantly preventing an occupant restraining webbing from moving in the longitudinal direction so as to reliably restrain the occupant.

2. DESCRIPTION OF THE PRIOR ART

Heretofore, there have been proposed automatically fastening type seatbelt systems for automatically fastening a restraining webbing to an occupant of a vehicle after he is seated. There have also been proposed webbing lock devices used in said automatically fastening type seatbelt systems for making it possible to freely wind the webbing out of a takeup shaft during normal running condition of the vehicle and for suddenly preventing the webbing from being wound out in an emergency of the vehicle. Said webbing lock device is of such an arrangement that a portion of the webbing between the takeup shaft and the portion of the webbing fastened to the occupant is clamped between a pair of lock members to prevent the webbing from moving in the longitudinal direction, so that the occupant can be positively restrained. The lock members of said lock device have clamping surfaces being wave-shaped in cross section, whereby frictions generated between the lock members and the webbing are increased, so that the webbing can be reliably locked. During an emergency of the vehicle, a pair of wave-shaped surfaces are adapted to bend the intermediate portion of the webbing into a wave-shape, whereby the frictions generated between the webbing and the lock members are increased.

However, because the lock members are subjected to a high tension of the webbing during clamping the webbing therebetween, it is necessary to form the lock members into shapes capable of maintaining a predetermined mechanical strength, thus causing the production efficiency to be decreased to a considerable extent. Furthermore, the lock members using the wave-shaped surfaces are comparatively large-sized and heavy in weight, thus preventing the lock device from being rendered compact and light weight.

Additionally, when the clamping surfaces of the lock members are formed flat, the tension of the webbing is sharply changed in the clamping portions of the lock members during an emergency, thereby presenting the disadvantage of the webbing being ruptured.

SUMMARY OF THE INVENTION

The present invention has been developed to obviate the above described disadvantages, and has as its object the provision of a webbing lock device being highly simplified in construction and capable of preventing the webbing from being ruptured by clamping same under a proper tension gradient and reliably restraining the occupant.

In the webbing lock device according to the present invention, one or both of the clamping surfaces of the lock members are formed into surfaces of curvature, and said surfaces of curvature have a progressively increased clamping gap from the takeup shaft side to the occupant-fastening side during locking, thereby moderating the change in tension gradient of the webbing.

Description will hereunder be given of the embodiments of the present invention with reference to the drawings.

DESCRIPTION OF THE PREFERRED EMBODIMENT

Figure 1:
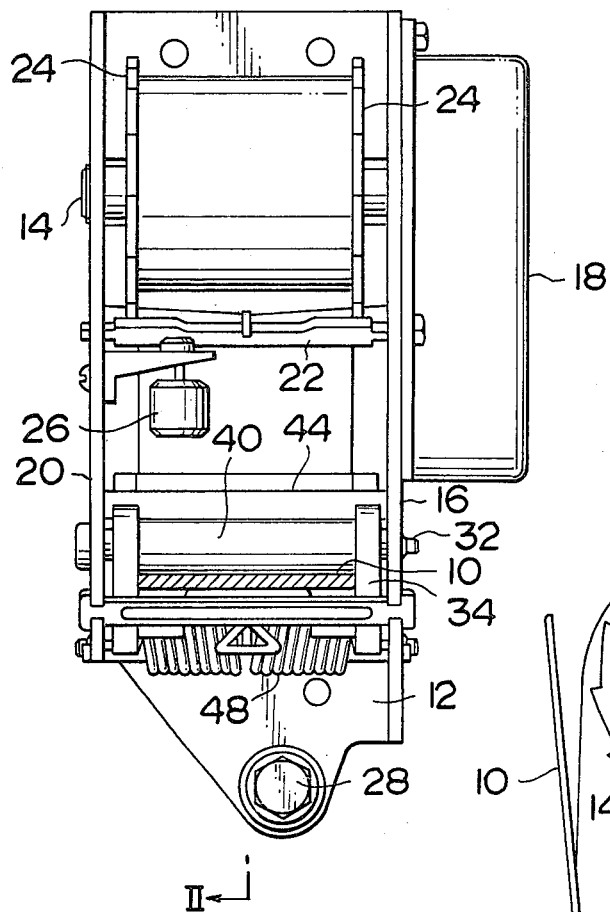
FIG. 1 is a front view showing a first embodiment of the webbing lock device according to the present invention.
Figure 2:
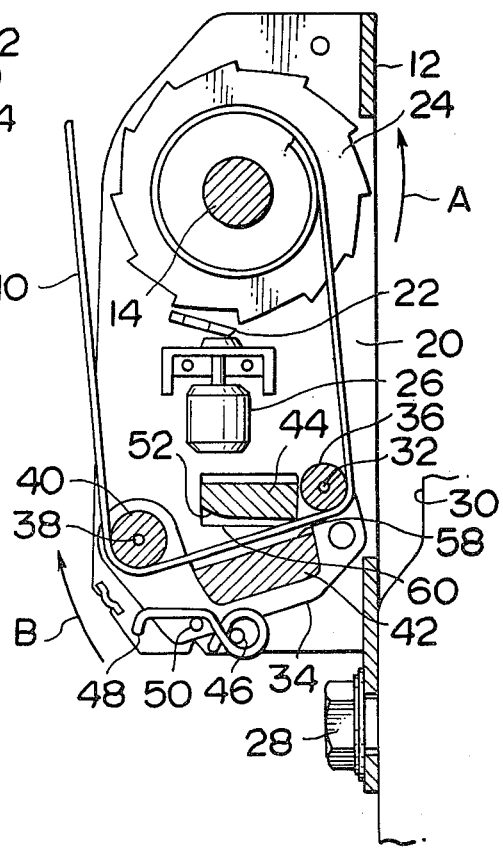
FIG. 2 is a sectional view taken along the line II—II in FIG. 1.

FIGS. 1 and 2 show the first embodiment of the present invention, in which one end of an occupant restraining webbing 10 is wound on a takeup shaft 14 journalled on a letter 'U' shaped frame 12. The other end, of the webbing 10 not shown, reaches the occupant-fastening portion. Furthermore, the takeup shaft 14 is biased in the wind-up direction of the webbing 10 (a direction indicated by an arrow A in FIG. 2) by a spiral spring retractor 18 secured to one leg 16 of the letter 'U' shaped frame 12.

A pawl 22 is rotatably journalled across one leg 16 and the other leg 20 of the letter 'U' shaped frame 12 in opposed relationship to a pair of ratchet wheels 24. When a pendulum 26 suspended from the leg 20 detects the acceleration of the vehicle and tilts, said pawl 22 is lifted to come into meshing engagement with the ratchet wheels 24 to prevent the ratchet wheels 24 and the takeup shaft 14 from being wound out. In addition, the letter 'U' shaped frame 12 is secured to the body of vehicle 30 through a mounting bolt 28 in such a manner that the axis of the pendulum 26 becomes vertical.

A lock lever 34 is pivotally supported across the legs 16 and 20 of the letter 'U' shaped frame through a pivot 32. On said lock lever 34, a small roller 36 and a large roller 40 are rotatably journalled through the pivot 32 and through a pin 38 pivoted at the forward end thereof, respectively, and the intermediate portion of the webbing 10 wound out of the takeup shaft 14 is wound on said rollers 36, 40 and thereafter, reaches the occupant-fastening portion.

Mounted on the intermediate portion of said lock lever 34 is a movable lock member 42, which, together with the lock lever 34, is rotatable about the pivot 32, and disposed in opposed relationship to a stationary lock member 44 racked across the legs 16, 20.

Here, the lock lever 34 is biased to rotate about the pivot 32 by receiving a biasing force of the torsional coil spring 48 secured through a spring pin 46 racked across the legs 16, 20 of the letter 'U' shaped frame 12 and through a pin 50 provided at the forward end thereof. In the lock lever 34, the movable lock member 42 is rotated by said biasing force to the maximum in a direction of being separated from the stationary lock member 44 and stopped as shown in FIG. 2. When the tension in the webbing 10 is increased during an emergency of the vehicle, said lock lever 34 is subjected to the tension through the large roller 40 to be rotated against the biasing force of the torsional coil spring 48 (in a direction indicated by an arrow B in FIG. 2), whereby the movable lock member 42 approaches the stationary lock member 44 to clamp the webbing 10 therebetween (Refer to FIG. 4).

Figure 3:
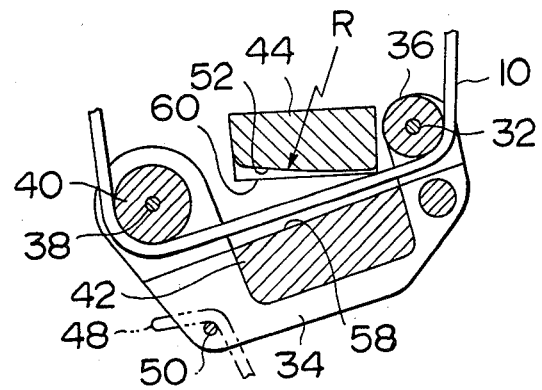
FIG. 3 is an enlarged view showing the lock members.
Figure 4:
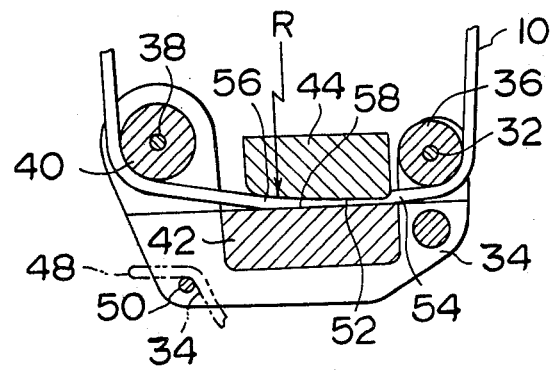
FIG. 4 is a view illustrating the lock members in an active positions.
Figure 5:
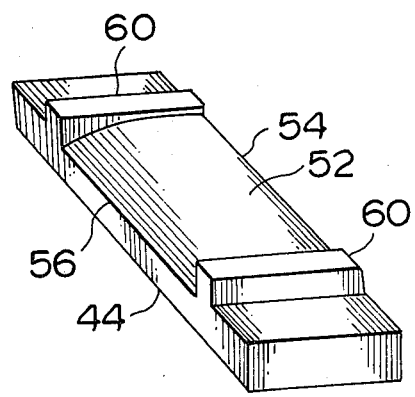
FIG. 5 is a perspective view showing the stationary lock member.

Detailed description will hereunder be given of said stationary lock member 44 as shown in FIGS. 3 through 5 in detail. A clamping surface 52 of the stationary lock member 44 is bent under a predetermined curvature R, whereby a clamping gap for the clamped webbing is progressively increased from the takeup shaft side 54 to the occupant-fastening side 56 as shown in FIG. 4.

On the other hand, a clamping surface 58 of the movable lock member 42 is formed into a flat surface adapted to be abutted against by stoppers 60 projected from about opposite ends of the stationary lock member 44. When said stoppers 60 abut against the clamping surface 58, the gap formed between the lock members 42 and 44 is prevented from becoming a value less than a predetermined value, so that the webbing 10 is not clamped under a pressure more than necessary and ruptured.

Description will be given of operation of this embodiment as arranged above. FIGS. 1 and 2 show the normal running condition of the vehicle, in which the occupant can be fastened with the webbing 10 by winding the webbing 10 out of the takeup shaft 14, and, during running of the vehicle, he may adjust the wound-out length of the webbing 10 so that he can change his driving posture. During the normal running of the vehicle, only the biasing force of the spiral spring retractor 18 acts on the webbing 10, whereby the tension of the webbing 10 is comparatively low, and consequently, the lock lever 34 under said biasing force of the torsional coil spring 48 overcomes the tension of the webbing 10 and maintains the state shown in FIG. 2, so that the movable lock member 42 is separated from the stationary lock member 44, thus avoiding interference with the movement of the webbing 10 in the longitudinal direction.

Next, when the vehicle has fallen into an emergency such as a collision, the pendulum 26 senses the acceleration of the vehicle and tilts, whereby the pawl 22 is lifted to come into meshing engagement with the ratchet wheels 24, so that the wind-out rotation of the takeup shaft 14 can be suddenly stopped. Simultaneously with this, the occupant fastened with the other end, not shown, of the webbing 10 is violently thrown out in the direction of collision, whereby a force acts on the webbing 10 in a direction of being wound out of the takeup shaft 14, so that the tension in the webbing 10 is sharply increased.

With the above described arrangement, the lock lever 34 under the tension of the webbing 10 overcomes the biasing force of the torsional coil spring 48 to be rotated about the pivot 32. This rotation brings the movable lock member 42 into contact with the stationary lock member 44 to clamp the intermediate portion of the webbing 10, whereby the high tension generated in the occupant-fastening portion is supported between the lock members 42 and 44, so that no high tension is generated in a portion of the webbing 10 between the small roller 36 and the takeup shaft 14. As a result, such a phenomenon does not take place that the webbing 10 wound on the takeup shaft 14 in layers is wound out under a high tension, i.e., the condition of loosely wound-up webbing, and, no stretch occurs in a portion of the webbing 10 between the smaller roller 36 and the takeup shaft 14, so that the occupant can be positively restrained by the webbing 10, thereby securing him in safety.

Figure 6:
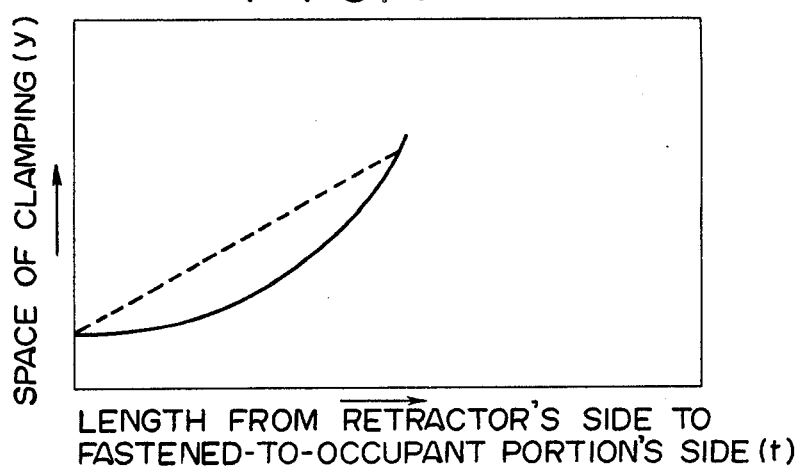
FIG. 6 is a graphic chart showing the change in the clamping gap against the length from the takeup shaft side to the occupant-fastening side.

Description will now be given of the changes in the clamping gap between the aforesaid lock members 42 and 44. As shown in FIG. 6, the clamping surfaces in this embodiment are changed under a predetermined curvature, whereby the clamping gap Y is progressively increased from the takeup shaft side to the occupant-fastening side. In contrast to this, a broken line in FIG. 6 indicates an example in which a clamping gap is changed between flat surfaces inclined to each other.

Figure 7:
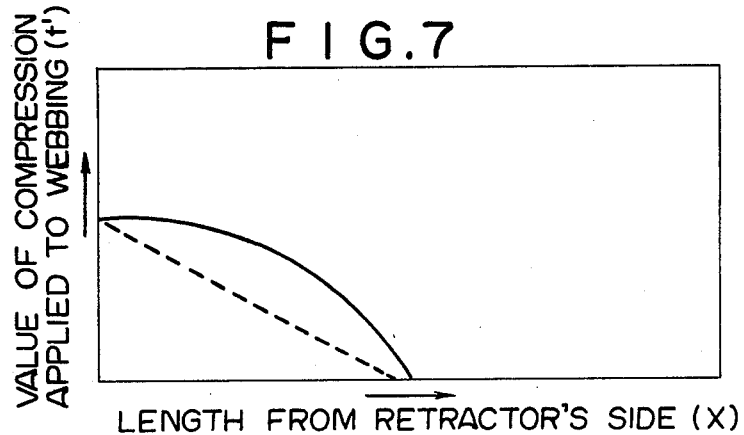
FIG. 7 is a graphic chart showing the value of compression of the webbing against the length from the takeup shaft side to the occupant-fastening side.
Figure 8:
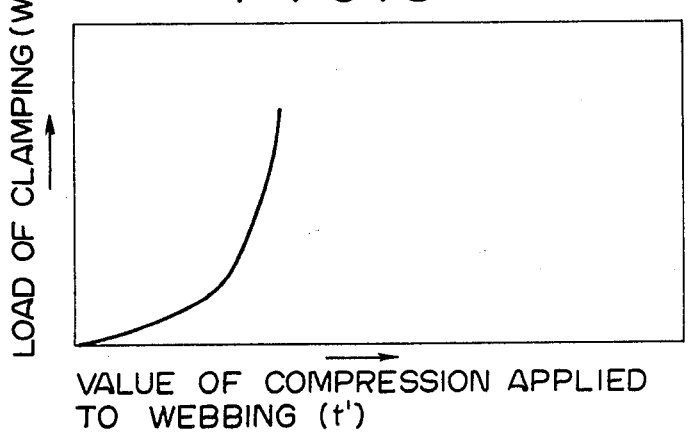
FIG. 8 is a graphic chart showing the clamping load against the value of compression of the webbing.

As a result, as shown in FIG. 7, the value of compression $t'$ of the webbing during locking is inversely proportional to the clamping gap as shown in FIG. 6. Furthermore, a clamping load W (a reaction force, to which the lock members 42 and 44 are subjected during locking) against said value of compression $t'$ of the webbing is represented by a curve of secondary degree sharply varying with the increase in the value of compression of the webbing (Refer to FIG. 8).

Figure 9:
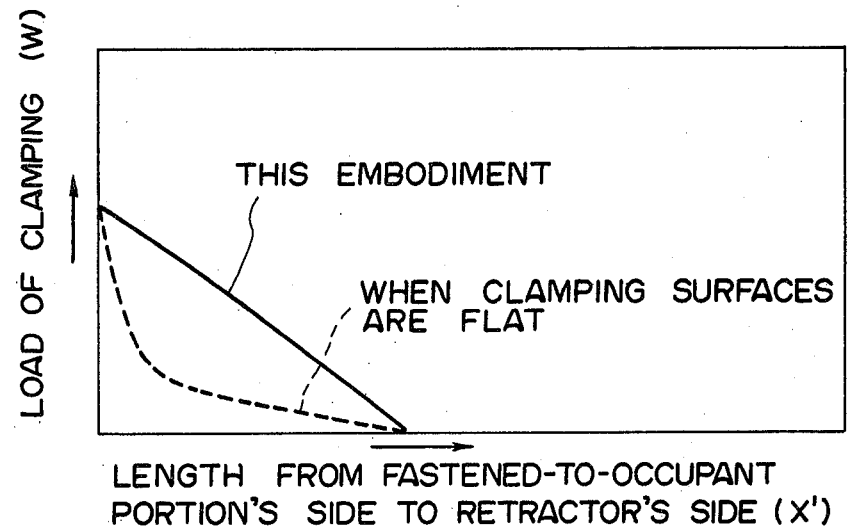
FIG. 9 is a graphic chart showing the clamping load against the length from the occupant-fastening side to the takeup shaft side.

Consequently, as shown in FIG. 9, the clamping load W applied to the clamping surfaces from the occupant-fastening side 56 to the takeup shaft side 54 is adapted to decrease substantially rectilinearly, whereby no sharp change in the tension occurs, thus enabling to obviate the disadvantage of the webbing 10 being ruptured at the clamped portion. In addition, as indicated by a broken line in FIG. 9, in the case the clamping surfaces are formed into flat surfaces, the clamping load sharply changes, whereby there is a possibility of the webbing 10 being ruptured at the clamped portion.

In addition, the aforesaid stationary lock member 44 is provided thereon with the stoppers 60, whereby the values of projection of the stoppers 60 from the clamping surface 52 is adjustable to prevent the clamping gap from being decreased to less than a predetermined value, so that the clamping load can be restricted within the limit of rupture, thereby enabling to prevent the webbing from being ruptured by sliding out the webbing through the clamping gap even if an unusual load is applied to the webbing.

Figure 10:
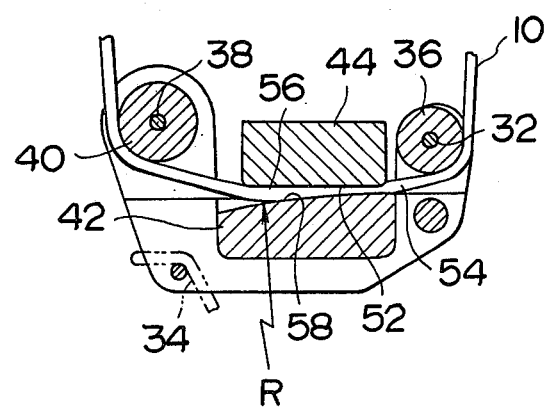
FIG. 10 is an enlarged view showing a second embodiment of the lock members according to the present invention.

Next, FIG. 10 shows the second embodiment of the present invention, in which the movable lock member 42 is formed at the clamping surface 58 thereof with a surface of curvature as differed from the preceding embodiment. In this embodiment also, the clamping surfaces may be progressively increased toward the occupant-fastening side, so that the same advantage as in the preceding embodiment can be obtained.

Needless to say, it is possible to form the aforesaid surface of curvature not only on either one of the lock members but also on the both lock members.

As has been described hereinabove, the webbing lock device according to the present invention is of such an arrangement that the clamping surfaces are formed into the surfaces of the predetermined curvature, and hence, can offer such outstanding advantages that the lock device can be rendered compact and lightweight to a considerable extent, the lock members can be easily worked on, and the webbing at the clamped portion can be reliably held to prevent the webbing from being ruptured.

We claim:

1. A webbing lock device for clamping and locking a portion of an occupant restraining webbing between a takeup shaft and an occupant-fastening portion by means of a pair of lock members, wherein at least one of said pair of lock members has a clamping surface for making a clamping gap which is progressively increased from the takeup shaft side to the occupant-fastening portion during locking to thereby prevent the clamped webbing from being sharply changed in tension, said lock members being formed to clamp said webbing along a portion of the length of said webbing.

2. A webbing lock device as set forth in claim 1, wherein said clamping surface is a circular arc having a radius of a predetermined length.

3. A webbing lock device as set forth in claim 1, wherein a curvature is formed on the clamping surface of the other of said pair of lock members.

4. A webbing lock device as set forth in claim 1, wherein one of said pair of lock members is provided at the clamping surface thereof with projecting stoppers for restricting the approach of the other lock member to a predetermined distance.

5. A webbing lock device as set forth in claim 1, wherein said pair of lock members include a stationary lock member solidly secured to a frame for journalling said takeup shaft, and a movable lock member adapted to approach said stationary lock member during an emergency.

6. A webbing lock device as set forth in claim 5, wherein said movable lock member is secured to a lock lever journalled on said frame.

7. A webbing lock device as set forth in claim 6, wherein said lock lever is biased by a spring confined between said frame and said lock lever in the direction of the movable lock member being separated from the stationary lock member.

8. A webbing lock device as set forth in claim 7, wherein a roller, on which the intermediate portion of the webbing is wound to be guided, is journalled on said lock lever.

9. A webbing lock device as set forth in claim 5, wherein ratchet wheels are solidly secured to said takeup shaft and a pawl journalled on the frame is brought into meshing engagement with said ratchet wheels to prevent the webbing wind-out rotation of the takeup shaft in an emergency of the vehicle.

10. A webbing lock device for clamping and locking the intermediate portion of an occupant restraining webbing to positively restrain an occupant in an emergency of a vehicle, comprising:

(a) a frame solidly secured to the body of the vehicle;

(b) a takeup shaft journalled on said frame for winding thereon one end of the occupant restraining webbing by its biasing force, the other end of said webbing being connected to an occupant-restraining portion;

(c) acceleration detecting and operating means interposed between said takeup shaft and said frame for stopping the webbing wind-out rotation of the takeup shaft in an emergency of the vehicle;

(d) a stationary lock member solidly secured to said frame, one surface of which is formed into a first webbing clamping surface;

(e) a lock lever journalled on said frame and provided at a portion thereof with a movable lock member, one surface of said lock member being formed into a second webbing clamping surface;

(f) a guide member provided at the forward end of said lock member, on which the intermediate portion of the webbing between the takeup shaft and the occupant-restraining portion is wound, whereby, when a tension in the webbing is increased, the lock lever is rotated to cause the movable lock member to approach the stationary lock member; and (g) a surface of curvature formed on either said first webbing clamping surface or said second webbing clamping surface for progressively increasing the clamping gap from the takeup shaft side to the occupant-fastening side during clamping the webbing, whereby a sharp change in tension in the clamped webbing is avoided so as to prevent the webbing from being ruptured, said clamping surfaces being formed to clamp the webbing along a portion of the length of the webbing.

* * * * *